United States Patent
Tajan et al.

(10) Patent No.: US 9,453,414 B2
(45) Date of Patent: Sep. 27, 2016

(54) CLEAT FOR OPEN-WORK BLADE FOOT

(71) Applicant: SNECMA, Paris (FR)

(72) Inventors: Sebastien Tajan, Sucy En Brie (FR); Christophe Jacquemard, Hericy (FR)

(73) Assignee: SNECMA, Paris (FR)

( * ) Notice: Subject to any disclaimer, the term of this patent is extended or adjusted under 35 U.S.C. 154(b) by 458 days.

(21) Appl. No.: 14/044,208

(22) Filed: Oct. 2, 2013

(65) Prior Publication Data

US 2014/0099205 A1    Apr. 10, 2014

(30) Foreign Application Priority Data

Oct. 10, 2012    (FR) ...................... 12 59650

(51) Int. Cl.
| | | |
|---|---|---|
| *B64C 11/06* | (2006.01) | |
| *F01D 5/08* | (2006.01) | |
| *F01D 5/30* | (2006.01) | |
| *B64D 27/00* | (2006.01) | |

(52) U.S. Cl.
CPC ............ *F01D 5/081* (2013.01); *B64C 11/06* (2013.01); *F01D 5/30* (2013.01); *F01D 5/3007* (2013.01); *B64D 2027/005* (2013.01); *Y02T 50/66* (2013.01); *Y02T 50/672* (2013.01)

(58) Field of Classification Search
CPC ....... B64C 11/02; B64C 11/04; B64C 11/06; B64C 11/065; B64C 11/08; B64C 11/10; B64C 11/12; B64C 2027/005; F01D 5/081; F01D 5/30; F01D 5/3007; F04D 29/322; B64D 2027/005
See application file for complete search history.

(56) References Cited

U.S. PATENT DOCUMENTS

| | | | |
|---|---|---|---|
| 5,318,405 A | 6/1994 | Meade et al. | |
| 5,622,476 A * | 4/1997 | Adde .............. | F01D 5/323 416/220 R |
| 6,736,602 B2 * | 5/2004 | Carney .............. | F01D 5/26 416/220 R |
| 7,108,484 B2 * | 9/2006 | Thenaisie ............ | F01D 5/323 416/221 |
| 7,198,463 B2 * | 4/2007 | Kanebako ............ | F01D 5/081 415/175 |
| 7,334,996 B2 * | 2/2008 | Corbin ............... | F01D 5/3007 416/221 |
| 8,534,077 B2 * | 9/2013 | Beutin ............... | F01D 15/10 290/52 |
| 8,801,384 B2 * | 8/2014 | Fabre ................ | B64C 11/06 416/219 R |
| 2002/0090300 A1 * | 7/2002 | Douguet ............ | F01D 5/3015 416/220 R |
| 2011/0167835 A1 | 7/2011 | Beutin et al. | |
| 2014/0099205 A1 * | 4/2014 | Tajan ................. | B64C 11/06 416/95 |
| 2014/0099206 A1 * | 4/2014 | Tajan ................. | F01D 5/081 416/95 |
| 2014/0341739 A1 * | 11/2014 | Tajan ................. | B64C 11/346 416/147 |

FOREIGN PATENT DOCUMENTS

| | | |
|---|---|---|
| DE | 10 2005 008 5 | 9/2005 |
| EP | 0 709 547 A1 | 5/1996 |
| EP | 1 223 309 A1 | 7/2002 |
| EP | 1 693 551 A1 | 8/2006 |
| FR | 2 941 494 A1 | 7/2010 |
| FR | 2 957 051 A1 | 9/2011 |

OTHER PUBLICATIONS

U.S. Appl. No. 14/048,357, filed Oct. 8, 2013, Tajan et al.
French Preliminary Search Report issued May 8, 2013, in French 1259650, filed Oct. 10, 2012 (with English Translation of Categories of Cited Documents).

* cited by examiner

*Primary Examiner* — Igor Kershteyn
*Assistant Examiner* — Christopher R Legendre
(74) *Attorney, Agent, or Firm* — Oblon, McClelland, Maier & Neustadt, L.L.P.

(57) ABSTRACT

A cleat for a blade foot of a blade of a propeller of a turboengine is provided. The cleat allows the discharge of ventilation airflow of the blade foot.

11 Claims, 4 Drawing Sheets

CLEAT FOR OPEN-WORK BLADE FOOT

TECHNICAL FIELD

The present invention relates to the field of turboengines, especially that of open propellers for a turboengine, and more specifically to cooling of elements of these propellers, blade feet in particular. In relates accordingly to a cleat for a blade foot, a propeller for a turboengine comprising such a cleat, and also the turboengine comprising such a propeller.

The invention applies to any type of terrestrial or aeronautical turboengines, and especially to aircraft turboengines such as turbojets and turboprops. More particularly, the invention applies preferably in the field of turboengines for aircraft whereof the receiver comprises a pair of open contrarotating propellers, this type of turboengine also being called <<open fan>>, or having the English terms <<open rotor>> or <<propfan>>. Such a turboengine can comprise for example a fan fixed directly on the power turbine and outside the nacelle, or driven by means of a reducer power turbine.

PRIOR ART

FIG. 1 schematically illustrates a turboengine 1 with a pair of open contrarotating propellers, so-called <<open rotor>>, according to a classic realisation of the prior art, as is known from patent application FR 2 941494.

In this FIG. 1, the direction A corresponds to the longitudinal direction or axial direction, parallel to the longitudinal axis 2 of the turboengine 1. The direction B corresponds as such to the radial direction of the turboengine 1. Also, arrow 4 shows the main direction of gas flow through the turboengine 1. The terms <<upstream>> and <<downstream>> utilised throughout the description are to be considered relative to this gas discharge direction 4.

In its front part, the turboengine 1 has an air intake 6 continuing to the rear via a nacelle 8, the latter comprising overall an outer skin 10 and an inner skin 12, both centred on the axis 2 and offset radially to each other.

The inner skin 12 forms an external radial housing for a gas generator 14, conventionally comprising, from front to back, a low-pressure compressor 16, a high-pressure compressor 18, a combustion chamber 20, a high-pressure turbine 22, and an intermediate-pressure turbine 24. The compressor 16 and the turbine 24 are connected mechanically by a shaft 26 to form a low-pressure body, while the compressor 18 and the turbine 22 are connected mechanically by a shaft 28 to form a higher-pressure body. Consequently, the gas generator 14 preferably has a classic design, a so-called double body.

Downstream of the intermediate-pressure turbine 24 is a receiver 30 with a pair of open contrarotating propellers, driven in this example by free power turbines. As a variant, a reducer power turbine can be used. More precisely, this receiver 30 is placed downstream of a fixed housing 42, itself arranged in the rear extension of the external radial housing 12 of the gas generator 14. Also, the housings 12 and 42 can be made in a single piece. The fixed housing 42 then extends to the rear as it narrows according to the radial direction to form a fixed shaft 57 centred on the axis 2, forming the fixed housing of the receiver 30.

The receiver 30 first comprises a first rotating assembly 32a fitted with a first propeller 32, a first free power turbine 34 driving this propeller, and a first rotating structural device 33 located in the axial extension of the free turbine 34 to the front, by being interposed between the first stage of this turbine and the fixed housing 42. The structural rotating device 33 generally has the form of a plurality of arms spaced circumferentially to each other, and which extend radially. These arms are connected to the first propeller 32 by bearing the external turbine housing 49, in turn connected to the propeller 32 in particular by a flange or a plurality of clips 44 to radially deflect this propeller 32 to the exterior. The clips 44 have an internal radial end attached to the external housing 49, and an external radial end attached to a polygonal ring (not shown in FIG. 1) for support of blades 48. These blades 48 project radially to the exterior from a housing or external propeller cowling 46, whereof one of the particular features is being in the rear aerodynamic continuity of the outer skin 10 of the nacelle.

Similarly, the receiver 30 comprises a second rotating assembly 36a fitted with a second propeller 36, a second free power turbine 38 driving this propeller, and a second structural rotating device 37 located in the axial extension of the free turbine 38 to the rear, being located behind the last stage of this turbine 38. The rotating structural device 37, which extends essentially radially, supports the second propeller 36 by being connected thereto in particular by a flange or a plurality of clips 51 for radially deflecting the propeller 36 to the exterior. Here also, the clips 51 have an internal radial end attached to the rotating structural housing 37, and an external radial end attached to a polygonal ring (not shown in FIG. 1) to support the blades 55. These blades 55 project radially towards the exterior from an external housing or cowling 54, which is in the rear aerodynamic continuity of the external cowling 46 of the first propeller 32.

Also, the first and second free turbines 34, 38 are nested in each other to form a pair of contrarotatory turbines. The stages of the first turbine 34 are arranged to alternate with the stages of the second turbine 38, in direction A. This doublet therefore can also be assimilated into a turbine with two contrarotatory rotors. By way of indication, the free turbines 34, 38 have no direct mechanical link with the rotating component of the gas generator 14, specifically they do not drive nor are driven by the elements 16, 18, 22, 24. Only the gas of the primary seam escaping from the intermediate-pressure turbine 24 therefore ensures rotation of these free turbines 34, 38 forming the doublet of contrarotatory turbines.

In reference now more specifically to FIGS. 2 to 4, the design of the first propeller 32 is shown in greater detail, given that the second propeller 36 has an identical or similar design, and that accordingly it will not be described further.

As mentioned earlier, the propeller 32 comprises a polygonal ring 47 serving as support for the blades 48, this ring 47 forming a hub of the propeller. It comprises a plurality of housings 50 spaced circumferentially to each other, these housings 50 being called radial housings. Each of them receives a pivot 52, a roller 80 being interposed between this pivot 52 and its associated housing 50 forming a bore, as shown in FIG. 3.

Each pivot 52 has a lower part 52a placed inside its associated housing, this lower part 52a being substantially cylindrical and hollow so as to present a cross-section in a general U-shape open radially towards the interior. Also, the pivot 52 extends radially towards the exterior via an upper part 52b located above the ring 47, this upper part 52b having a groove 56 shown in FIG. 4, and the function of which is to hold the foot 58 of the associated blade 48. So, the pivot 52 bears the blade 48 and enables it to be adjusted by controlling the rotation of this same pivot 52 within its housing 50 of the polygonal ring 47.

The propeller 32 also includes the external cowling 46 illustrated only in FIGS. 1 and 3. The external surface of this cowling is contacted by external air. In this respect, it is indicated that each blade 48 is equipped with a platform 59 from which its aerodynamic part 60 projects radially towards the exterior. Each platform 59, circular in form, is placed within an orifice provided through the cowling 46 to obtain substantially projecting aerodynamic junctions.

As is more evident from FIG. 3, it is provided a blade cavity 64 associated with the blade 48, the aim of this cavity being to isolate the blade foot from the rest of the turboengine 1, in particular of the primary seam passing radially towards the interior. The cavity 64 has been identified schematically in FIG. 3 by the dotted line referenced 64. It is effectively closed radially towards the exterior by the platform 59 and the external cowling 46 forming aerodynamic fairing, but also closed towards upstream by one or more caches 66, closed towards downstream by one or more caches 68, and closed radially towards the exterior by one or more caches 70, here a single cache 70 fixed to the flange or the abovementioned clips 44.

It is noted that a cavity of a blade foot can be provided for each blade, as shown in FIG. 5 with an internal cache 70 provided for each blade, making the cavities independent of each other. Alternatively, a single cavity of blade feet can be shared by all the blades 48 of the propeller 32, the single retained internal cache 70 then taking the form of a crown.

As a possibility for ventilation, each cavity 64 can for example be supplied with external air via a bailer 72 or similar (for example a simple orifice), placed on the external cowling 46. This bailer can especially be placed downstream, and the air transiting via the cavity 64 can for example then be extracted via an outlet (not shown) located further upstream. As it exits via the cavity 64, the fresh external air contacts and cools by ventilation the elements located in this cavity 64, in particular the foot 58 of the blade, as has been shown by arrow 53.

Ventilation and cooling of the elements of the propeller 32, and in particular the blade feet 58, are difficult to execute, especially due to the pressure conditions with a low Mach number. However, such ventilation and such cooling are particularly important to carry out when the blades 48 are made of composite materials, as they have reduced performance in high temperatures in comparison to metallic materials. Now, in the configuration shown in FIG. 1, so-called <<pusher>>, in which the open propellers are located to the rear downstream of the combustion chamber, these propellers are arranged just above the primary seam where hot gas can reach 500° C. It is therefore essential to provide specific ventilation to avoid overheating the blade feet of these open propellers.

Nevertheless, the proposed solution described hereinabove uses only the difference in pressure between the dynamic air intake downstream formed by the bailer 72, and the static air outlet upstream. It is therefore very dependent on the speed of the plane, which proves harmful during some phases such as deceleration and takeoff, where the airflow contacting the foot of the blade can prove inadequate for satisfactory cooling.

Also, this solution known from the prior art has the disadvantage of carrying out cooling and ventilation of the blade feet 58 only via the exterior of the pivots 52. In other words, the blade feet 58 are not cooled on direct contact of the ventilation airflow but only by conduction and/or convection mechanisms due to contact with pieces which are cooled by the ventilation flow. Because of this, cooling of the blade feet 58 is not optimal.

EXPLANATION OF THE INVENTION

The aim of the invention is to at least partially remedy the needs mentioned hereinabove and the disadvantages relative to the realisations of the prior art.

The particular aim of the invention is to propose a solution to enable efficacious ventilation and cooling of blade feet, in particular made of composite materials.

The object of the invention, according to one of its aspects, is a cleat for a blade foot of a turboengine propeller blade, characterised in that it is open-work to allow discharge of ventilation airflow of the blade foot.

The airflow is in particular external airflow, especially cold external airflow to allow ventilation.

The fact of having an open-work cleat can allow passage of the airflow for ventilating, and especially for cooling, the blade foot.

Due to the invention, it can be possible to ventilate and cool the blade feet by allowing circulation of the ventilation airflow directly in contact with the blade feet. The blade foot cleat, whereof the initial function is to support the blade, can be used to allow the formation of one or more passes of the ventilation airflow.

The cleat according to the invention can also comprise one or more of the following characteristics taken singly or as per all possible technical combinations.

The cleat can comprise at least one discharge channel of the airflow intended to be located under the blade foot.

Said at least one discharge channel of the airflow can comprise an axial discharge channel and/or a lateral discharge channel.

The choice and number of discharge channels for ventilation of the blade feet can be determined as a function of the preferred mechanical performance for the cleat and/or the blade.

The cleat can be open-work in a terminating manner or not. <<Terminating>> means that the openings of the cleat terminate on at least one edge of the cleat. In particular, at least one discharge channel, for example axial or lateral, or even all the discharge channels, can be terminating. As a variant, at least one discharge channel, for example axial or lateral, or even all the discharge channels, is not terminating.

The design of the blade foot cleat must especially ensure that the blade is pressed in its air cell when stopped, but also support the substantial forces generated by dynamic ingestions and stresses, limited over time but severe.

Yet another aim of the invention, according to another of its aspects, is a propeller for turboengine comprising a plurality of blades as well as a blade support ring provided with housings, each taking up a pivot bearing the foot of one of said blades,
characterised in that it comprises a cleat such as defined previously, placed between at least one of the pivots and the corresponding blade foot.

The propeller can in particular be an open propeller.

At least one of the pivots can be equipped with at least one counterweight system provided with at least one inner discharge channel of the airflow intended to come into contact with the cleat. The inner discharge channel of the airflow can cool the blade foot borne by the pivot. It can also enable cooling of any other element requiring specific ventilation. Similarly, it can also enable ejection of hot airflow to the exterior of the zone to be ventilated.

The inner channel formed in the counterweight system can capture and guide the airflow to the precise site where ventilation is required, that is, especially at the level of the blade feet.

The inner channel can have an inner end which terminates on the pivot and one at least of an introduction end and an ejection end of the airflow. In particular, the inner channel can comprise an introduction end of the airflow and an inner end terminating on the pivot to cool the pivot. As a variant, the inner channel can comprise an inner end terminating on the pivot, via which hot air from the pivot enters towards the inner channel, and an ejection end for evacuating hot air.

The introduction end and/or the ejection end can comprise introduction and/or ejection means in the form of an orifice or a bailer. The introduction end and/or the ejection end can preferably comprise a dynamic bailer for introduction and/or ejection of the airflow.

The pivot can comprise at least one inner communicating channel whereof one end terminates at the level of the blade foot and the other end terminates at the level of an inner channel of the counterweight system. The inner communicating channel can introduce the airflow from the inner end of the inner channel towards the blade foot, or eject the airflow from the blade foot towards the inner end of the inner channel. As a variant, the pivot can be provided with an inner communicating channel. The groove of the pivot for affixing the blade foot can for example be fitted with at least one orifice opposite an inner end of an inner channel of a counterweight system.

The pivot can also comprise at least one channel, for example lateral or axial, especially formed under the blade foot, to allow ventilation of the blade foot. Said at least one channel can or cannot be formed opposite a discharge channel of the cleat.

The counterweight system can comprise a counterweight arm and a counterweight. The inner channel can be located in the counterweight arm and/or the counterweight. Preferably, the counterweight arm can comprise the inner channel.

The pivot can be equipped with at least one first counterweight system, provided with at least one first inner channel fitted with an introduction end of the airflow and an inner end, and a second counterweight system, provided with at least one second inner channel fitted with an ejection end of the airflow and an inner end. The pivot can comprise a first inner communicating channel, whereof one end terminates at the level of the blade foot and the other end terminates at the level of the inner end of the first inner channel, and a second inner communicating channel, whereof one end terminates at the level of the blade foot and the other end terminates at the level of the inner end of the second inner channel.

The blades, in particular the blade feet, and/or said at least one counterweight system and/or the cleat and/or said at least one of the pivots can be made of composite material.

The counterweight arm can be made in at least two parts, especially metallic. The inner channel can especially be formed partially, especially by machining, in each of these two parts.

As a variant, the counterweight arm can be made in one part. The counterweight arm, especially made of composite material, for example woven or laminated, can integrate the inner channel, in particular from manufacture onwards.

Yet another aim of the invention, according to another of its aspects, is a turboengine, characterised in that it comprises a cleat such as defined previously or a propeller such as defined previously.

The propeller can for example be positioned upstream or downstream of a combustion chamber of the turboengine.

The turboengine can preferably be of <<open rotor>> type. In particular, the turboengine can comprise a pair of open contrarotating propellers, each of the two propellers being a propeller such as defined previously.

BRIEF DESCRIPTION OF DRAWINGS

The invention will be better understood from the following detailed description of a non-limiting embodiment of the latter, and from reference to the figures, schematic and partial, of the attached drawing, in which.

In all these figures, identical reference numerals can designate identical or similar elements.

Also, the different parts illustrated in the figures are not necessarily according to a uniform scale, to make the figures more legible.

DETAILED EXPLANATION OF A PARTICULAR EMBODIMENT

An embodiment of the invention relating to an aircraft turboengine with a pair of open contrarotating propellers will now be described hereinbelow, in reference to FIGS. 6 and 7, this example not being limiting, however.

Figure 6:
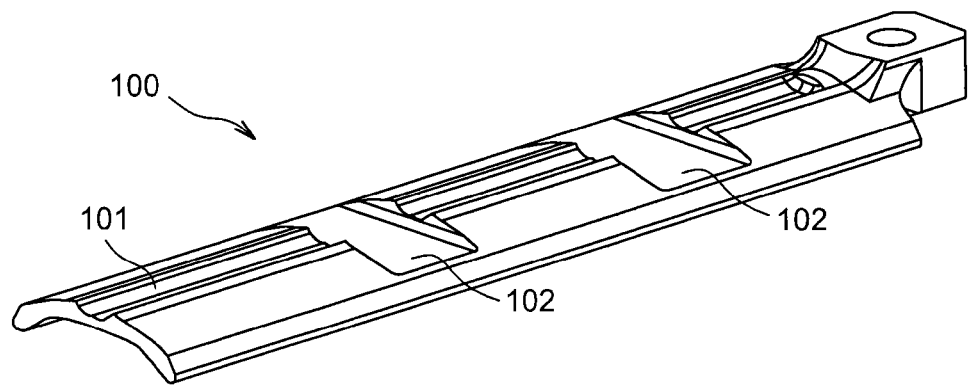
FIG. 6 illustrates in perspective an example of a cleat according to the invention.
Figure 7:
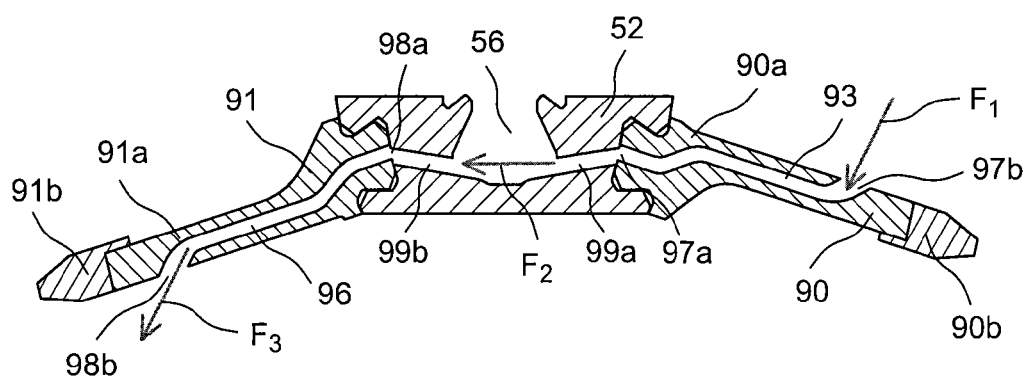
FIG. 7 illustrates, in section and partially, an example of a pivot comprising counterweight systems.

FIGS. 6 and 7 are schematic and partial, and reference should be made to FIGS. 1 to 5 previously described to view those elements not shown in FIGS. 6 and 7.

In reference to FIG. 6, this shows a cleat 100 according to the invention.

The cleat 100 is intended to be placed between the pivot 52 and the blade foot 58 to make discharge of airflow easier for cooling of the blade foot 58. The cleat 100 is in particular housed in the base of the blade housing, at the level of the groove 56.

For this purpose, the cleat 100 is open-work and comprises discharge channels 101, 102 of the airflow used as conduits for cooling air.

More particularly, in this example, the cleat 100 comprises an axial discharge channel 101 for airflow and two lateral discharge channels 102 for airflow. However, this example is not limiting and the cleat 100 could comprise other types of discharge channels, their choice and their number depending especially of the mechanical performance of the cleat 100 and of the blade 48.

Figure 1:
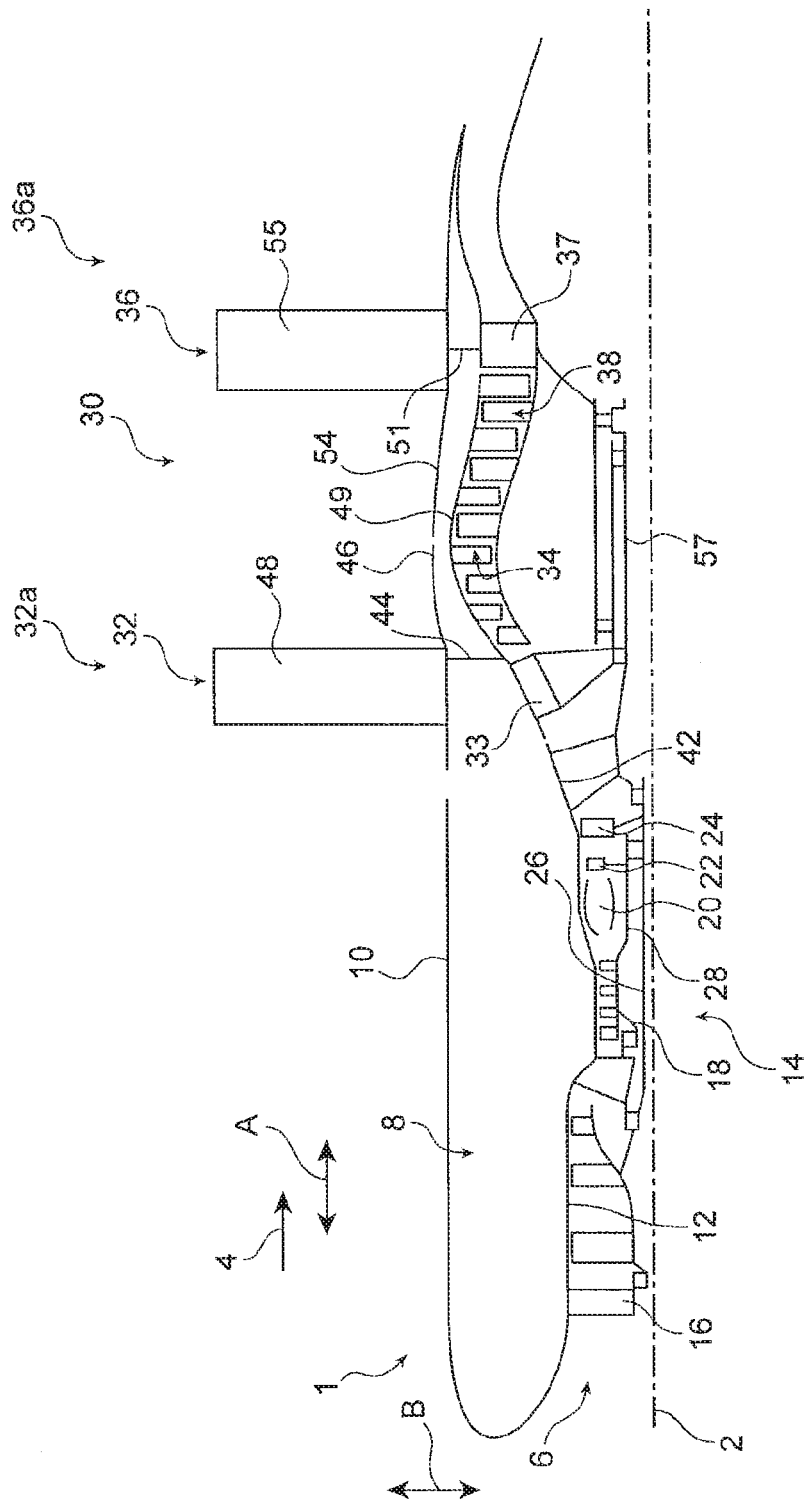
FIG. 1 illustrates a schematic view in longitudinal half section of a turboengine for aircraft comprising a receiver with a pair of contrarotatory propellers, according to a classic design of the prior art.
Figure 2:
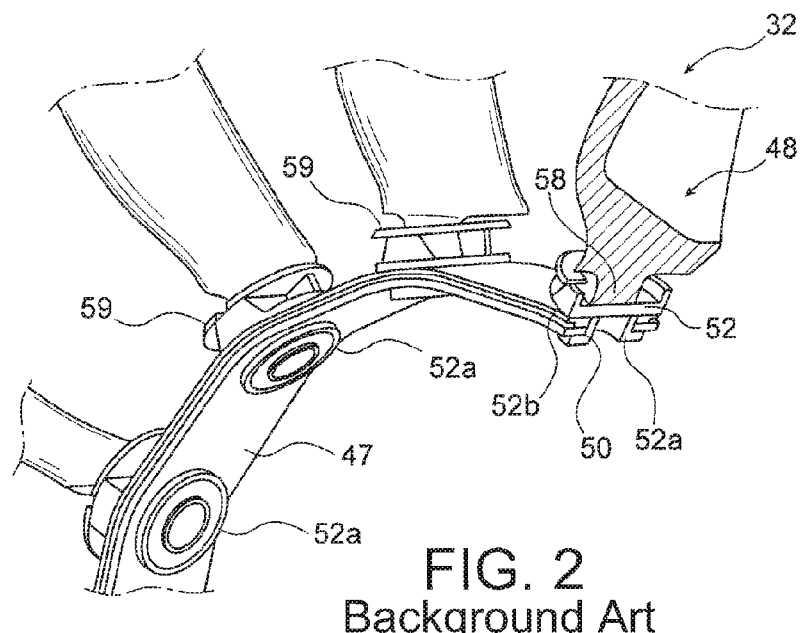
FIG. 2 illustrates a partial view in perspective of one of the contrarotatory propellers of the turboengine shown in FIG. 1.
Figure 3:
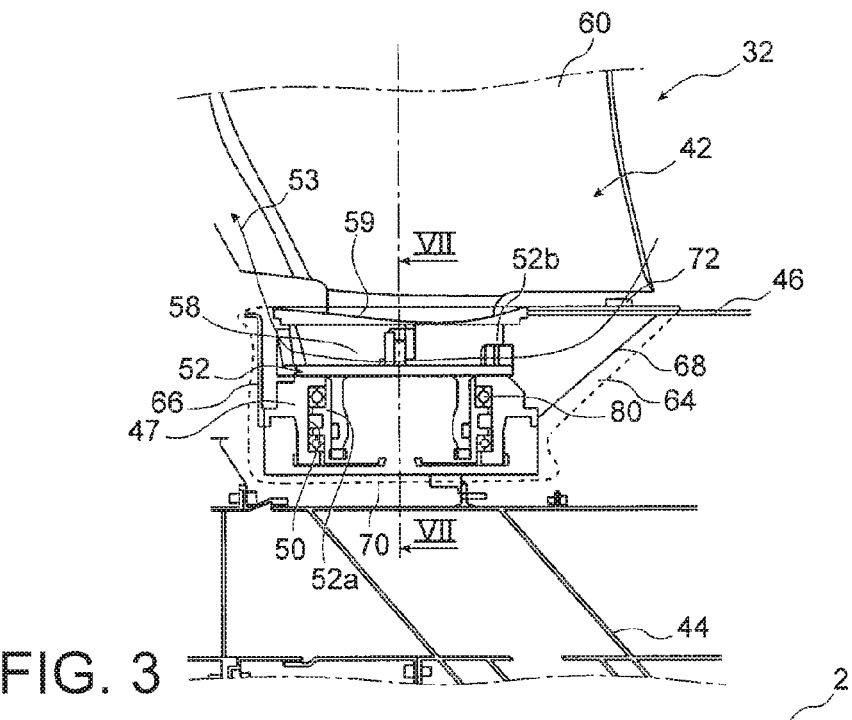
FIG. 3 illustrates a partial view in section showing in more detail the ring of support des blades of the propeller, and the surrounding elements.
Figure 4:
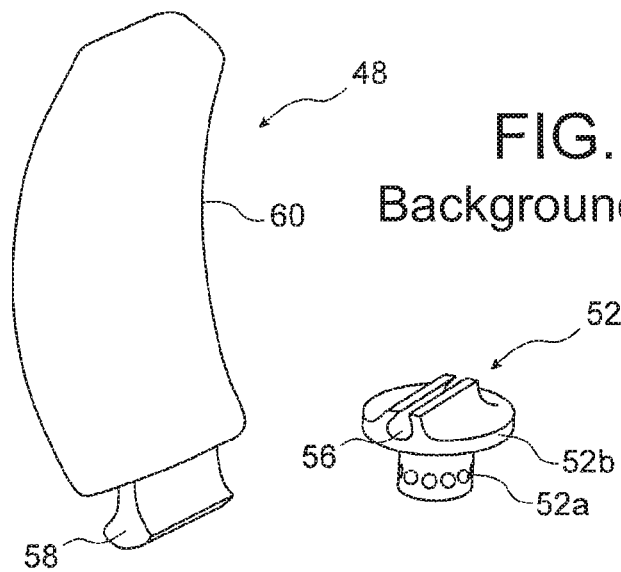
FIG. 4 illustrates an exploded view in perspective of a blade and of its associated pivot.
Figure 5:
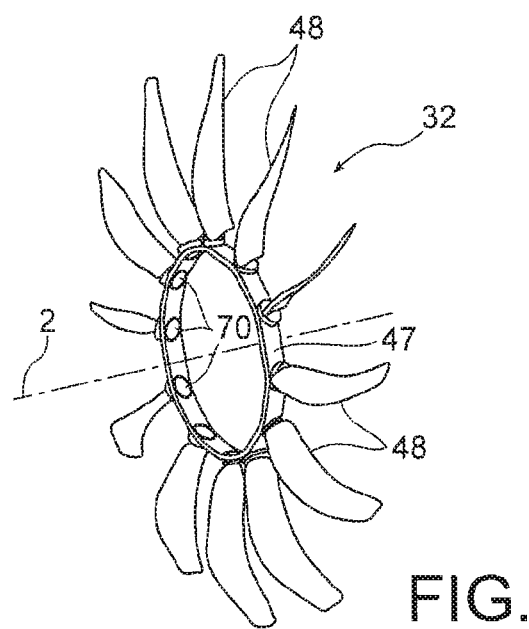
FIG. 5 illustrates a perspective view of a propeller of the prior art, equipped with several cavities of blade feet.

The cleat 100 can for example be advantageously placed on a pivot 52, such as described in reference to FIG. 4, the cleat 100 then being located between the pivot 52 and the blade foot 58 (not shown).

FIG. 7 illustrates a pivot 52 fitted with a groove 56 for affixing the blade foot 58.

The pivot 52 is equipped with a first counterweight system 90 and a second counterweight system 91. Each of the counterweight systems 90 and 91 is provided with an inner airflow channel 93 and discharge channel 96.

The first counterweight system 90 comprises a counterweight arm 90a and a counterweight 90b at the end of the arm 90a opposite the pivot 52. Similarly, the second counterweight system 91 comprises a counterweight arm 91a and a counterweight 91b at the end of the arm 91a opposite the pivot 52. The counterweight arm 90a and 91a comprise respectively the inner channels 93 and 96.

The inner channel 93 has an inner end 97a which terminates on the pivot 52 and an introduction end 97b of the airflow.

Also, the inner channel 96 has an inner end 98a which terminates on the pivot 52 and an ejection end 98b of the airflow.

The introduction end 97b and the ejection end 98b each comprise a detachable dynamic bailer for passage of the airflow.

In addition, the pivot 52 comprises a first inner communicating channel 99a whereof one end terminates at the level of the blade foot 58 and the other end terminates at the level of the inner channel 93 of the first counterweight system 90. Similarly, the pivot 52 comprises a second inner communicating channel 99b whereof one end terminates at the level of the blade foot 58 and the other end terminates at the level of the inner channel 96 of the second counterweight system 91.

In this way, the airflow is capable of being captured by the bailer dynamic at the level of the introduction end 97b of the first counterweight arm 90a according to the arrow $F_1$, then being discharged inside the inner channel 93 and of the inner communicating channel 99a to cool the blade foot 58 according to arrow $F_2$. At this level, the discharge channels 101 and 102 of the airflow of the cleat 100 permit passage of fresh air over almost the entire blade foot 58 to cool the latter. Then, the resulting hot flow can be discharged in the inner communicating channel 99b and in the inner channel 96 to be ejected at the level of the ejection end 98b of the second counterweight arm 91b according to arrow $F_3$, towards the exterior or towards the nacelle of the engine.

Producing the channels 101 and 102 of the cleat 100 to make circulation of the airflow easier can produce optimal cooling of the blade foot 58 since fresh airflow comes into direct contact with the latter.

In the above, the blades 48 and/or the counterweight systems 90 and 91 and/or the cleat 100 and/or the pivot 52 can be made of composite material.

Of course, the invention is not limited to the embodiment which has just been described. Various modifications can be made to it by the expert.

The expression <<comprising a>> must be understood as being synonymous with <<comprising at least one>>, unless specified otherwise.

The invention claimed is:

1. A propeller for a turboengine comprising:
   a blade including a foot;
   a pivot including a groove which receives the foot of the blade;
   a support ring provided with a housing receiving the pivot; and
   a cleat placed between the pivot and the blade foot,
   wherein the pivot includes a first inner communicating channel extending between a first side of the pivot and the groove, and a second inner communicating channel extending between the groove and a second side of the pivot, and
   wherein the cleat includes a discharge channel which allows fluid communication of airflow between the blade foot and the first and second inner communicating channels.

2. The propeller as claimed in claim 1, wherein the discharge channel is located under the blade foot.

3. The propeller as claimed in claim 2, wherein the discharge channel includes an axial discharge channel.

4. The propeller as claimed in claim 2, the discharge channel includes a lateral discharge channel.

5. The propeller as claimed in claim 1, wherein the pivot is equipped with a counterweight system provided with an inner channel of the airflow intended to come into contact with the cleat.

6. The propeller as claimed in claim 5, wherein the inner channel includes an inner end which terminates on the pivot and at least one of an introduction end and an ejection end of the airflow.

7. The propeller as claimed in claim 5, wherein the counterweight system is made of composite material.

8. The propeller as claimed in claim 1, wherein at least one of the blade, the cleat, and the pivot is made of composite material.

9. A turboengine comprising a propeller as claimed in claim 1.

10. The turboengine as claimed in claim 9, said propeller being located downstream of a combustion chamber of said turboengine.

11. The turboengine comprising a pair of open contrarotating propellers, each of the two propellers being said propeller as claimed in claim 1.

* * * * *